United States Patent
Baribault et al.

(10) Patent No.: US 9,003,173 B2
(45) Date of Patent: Apr. 7, 2015

(54) MULTI-OS (OPERATING SYSTEM) BOOT VIA MOBILE DEVICE

(75) Inventors: Gregory P. Baribault, Lynnwood, WA (US); Larry A. Morris, Kirkland, WA (US); Shai Guday, Redmond, WA (US); John Mark Miller, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 540 days.

(21) Appl. No.: 11/864,648

(22) Filed: Sep. 28, 2007

(65) Prior Publication Data

US 2009/0089569 A1    Apr. 2, 2009

(51) Int. Cl.
G06F 9/00 (2006.01)
G06F 15/177 (2006.01)
G06F 15/16 (2006.01)
G06F 9/44 (2006.01)

(52) U.S. Cl.
CPC ............. *G06F 15/16* (2013.01); *G06F 9/441* (2013.01)

(58) Field of Classification Search
USPC .................................. 713/1, 2; 717/174, 175
See application file for complete search history.

(56) References Cited

U.S. PATENT DOCUMENTS

| | | | |
|---|---|---|---|
| 4,663,707 A | 5/1987 | Dawson | |
| 6,032,255 A | 2/2000 | Shim et al. | |
| 6,055,631 A | 4/2000 | Chadha | |
| 6,065,037 A | 5/2000 | Hitz et al. | |
| 6,178,503 B1 * | 1/2001 | Madden et al. | 713/2 |
| 6,374,353 B1 | 4/2002 | Settsu et al. | |
| 6,732,265 B2 | 5/2004 | Esfahani et al. | |
| 6,928,542 B2 * | 8/2005 | Wen et al. | 713/2 |
| 6,957,075 B1 * | 10/2005 | Iverson | 455/456.3 |
| 6,971,002 B2 | 11/2005 | Austen et al. | |
| 6,973,447 B1 * | 12/2005 | Aguilar et al. | 1/1 |
| 7,424,601 B2 * | 9/2008 | Xu | 713/1 |
| 7,673,131 B2 * | 3/2010 | Azzarello et al. | 713/2 |
| 7,793,088 B2 * | 9/2010 | Inohiza | 713/1 |
| 7,822,962 B2 * | 10/2010 | Lam | 713/2 |
| 2001/0003835 A1 * | 6/2001 | Watts | 709/318 |
| 2002/0166046 A1 | 11/2002 | Bidarahalli | |
| 2003/0093658 A1 | 5/2003 | Wen et al. | |
| 2003/0097554 A1 * | 5/2003 | Cheston et al. | 713/2 |
| 2003/0110331 A1 | 6/2003 | Kawano | |
| 2003/0182546 A1 | 9/2003 | Suzuki | |

(Continued)

FOREIGN PATENT DOCUMENTS

| | | |
|---|---|---|
| CN | 1591331 A | 8/2004 |
| EP | 1 507 188 A2 | 2/2005 |

(Continued)

OTHER PUBLICATIONS

International Search Report for PCT Application No. PCT/US2008/076619, dated Mar. 19, 2009, 11 pages.

(Continued)

*Primary Examiner* — Zahid Choudhury
(74) *Attorney, Agent, or Firm* — Kate Drakos; John Jardine; Micky Minhas

(57) ABSTRACT

A system that facilitates different levels of operating system (OS) boot so as to provide users with rapid access to certain mobile device functionalities, security, applications, etc. is provided. An OS can be loaded in phases or stages commensurate with policies, preferences, actions, context, etc. Similarly, a particular OS or group of OSs can be loaded to address a particular scenario or requirement.

15 Claims, 11 Drawing Sheets

(56) References Cited

U.S. PATENT DOCUMENTS

| | | | |
|---|---|---|---|
| 2003/0188144 A1* | 10/2003 | Du et al. ........................ | 713/1 |
| 2003/0191623 A1 | 10/2003 | Salmonsen | |
| 2004/0003222 A1* | 1/2004 | Rich et al. ..................... | 713/1 |
| 2004/0249992 A1* | 12/2004 | Komarla et al. ................ | 710/8 |
| 2005/0038982 A1* | 2/2005 | Park et al. ..................... | 713/1 |
| 2006/0010314 A1 | 1/2006 | Xu | |
| 2006/0126656 A1 | 6/2006 | Ayyar et al. | |
| 2006/0227806 A1 | 10/2006 | Tseng | |
| 2006/0282654 A1 | 12/2006 | van der Veen et al. | |
| 2007/0005947 A1* | 1/2007 | Chartrand et al. ............. | 713/1 |
| 2007/0100480 A1* | 5/2007 | Sinclair et al. ................ | 700/48 |
| 2007/0239978 A1* | 10/2007 | Bharathy et al. ............... | 713/2 |
| 2007/0250692 A1* | 10/2007 | Linn ............................. | 713/1 |
| 2008/0020803 A1* | 1/2008 | Rios et al. ..................... | 455/565 |
| 2008/0162914 A1* | 7/2008 | Adrangi et al. ................ | 713/2 |
| 2008/0209255 A1* | 8/2008 | Seguin et al. .................. | 714/2 |

FOREIGN PATENT DOCUMENTS

| | | |
|---|---|---|
| JP | H11-265289 A | 9/1999 |
| JP | 2000-172359 A | 6/2000 |
| JP | 2002-108485 | 4/2002 |
| JP | 3003-351671 | 12/2002 |
| JP | 2002373317 A | 12/2002 |
| JP | 2003-196096 | 7/2003 |
| JP | 2003-280915 | 10/2003 |
| JP | 2004086330 A | 3/2004 |
| JP | 2004-252276 A | 9/2004 |
| JP | 2005-518603 | 6/2005 |
| JP | 2005-533328 A | 11/2005 |
| JP | 2007-195157 A | 8/2007 |
| KR | 20050045773 | 5/2005 |
| KR | 10-2006-0124047 A | 12/2006 |
| KR | 2006-0124047 | 12/2006 |
| KR | 10-2007-0122342 A | 12/2007 |
| WO | 2004008781 A2 | 1/2004 |

OTHER PUBLICATIONS

Linux Start up and Run Levels. http://www.comptechdoc.org/os/linux/howlinuxworks/linux_hlrunlevels.html. Last accessed on Feb. 15, 2007.
Hussein. Multiple-Boot with Platform Flash PROMs. Aug. 7, 2006. http://direct.xilinx.com/bvdocs/appnotes/xapp483.pdf.
T. Chen, et al. Multi-level Cross Platform BSP Framework (MCBF). http://www.actapress.com/PaperInfo.aspx?PaperID=27357. Last accessed on Feb. 15, 2007.
"European Search Report", Mailed Date: Sep. 24, 2010, Application No. EP/08/83/6596, Filed Date: Sep. 23, 2010, pp. 7.
"Cloud computing", Retrieved at << http://en.wikipedia.org/w/index.php?title=Cloud_computing&01did=157288708 >>, Sep. 12, 2007, pp. 1.
"Context awareness", Retrieved at << http://en.wikipedia.org/w/index.php?title=Context_awareness&oldid=160540010 >>, Sep. 26, 2007, pp. 4.
EP OA dated Oct. 12, 2010 for European Patent Application No. 08836596.0-1243 / 2193437, 1 page.
International Preliminary Report on Patentability mailed Mar. 19, 2009 for PCT Application No. PCT/US2008/076619, 10 pages.
"Japanese Office Action", Mailed Date: Mar. 25, 2013, Application No. 2010-527030, Filed date: Sep. 17, 2008.
Office Action (JP2010-527030), 10/29/20012.
English abstract/summary of JP-2002-108485.
"Notice of Final Rejection Received for Japan Patent Application No. 2010-527030", Mailed Date: Oct. 4, 2013, Filed Date: Sep. 17, 2008, 3 Pages.
"Notice of Allowance Received for Japan Patent Application No. 2010-527030", Mailed Date: Mar. 26, 2014, Filed Date: Sep. 17, 2008, 4 Pages.
"Office Action Issued in Japan Patent Application No. 2014-019123", Mailed Date: Dec. 1, 2014, 5 Pages.
Korean Office Action, mailed Oct. 28, 2014, Application No. 10-2010-7006351.

* cited by examiner

MULTI-OS (OPERATING SYSTEM) BOOT VIA MOBILE DEVICE

BACKGROUND

In the personal computer (PC) world, oftentimes a user desires an ability to select a particular operating system (OS) at startup or boot. This multi-OS feature can be desired as a function of specific applications or merely user preference. In other words, there are often situations where a particular OS is required to run a particular computer application. As well, because users become so adept at using a particular OS, there is often a strong preference to the features, functions and benefits of a particular OS.

Today, a PC can be configured to prompt a user upon startup with regard to a particular or preferred OS. The selection can range from different versions of the same OS to different OSs completely, for example, OSs from different manufacturers. Oftentimes, multiple users of a particular PC will have different preferences with respect to OS features. These multi-boot options enable users to personalize their computing session by enabling selection of a particular OS.

An OS is often a monolithic application that requires a vast amount of memory and processing power. While many PCs and notebook computers are capable of the necessary memory and processing power to employ the ever-growing functionality of OSs, many mobile devices are not capable of processing today's OSs. With the ever-increasing popularity of personal mobile devices, e.g., cell phones, smartphones, personal digital assistants (PDAs), personal music players, laptops, etc., 'mobility' has been the focus of many consumer products as well as services of wireless providers. For example, in the telecommunications industry, 'mobility' is at the forefront as consumers are no longer restricted by location with regard to communications and computing needs.

As mobile device popularity increases, the ability to make telephone calls, access electronic mail, communicate via instant message (IM), compute using standard office-type applications and access online services from any location has also continued to evolve. Together with this increase in functionality comes the need for larger more comprehensive OSs to handle the increased functionality. Unfortunately, these mobile devices are not always capable of today's OS requirements. More particularly, it is not uncommon for a consumer to become frustrated with the wait-time of booting a smart-phone today.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that facilitates different levels of operating system (OS) boot so as to provide users with rapid access to certain functionalities, security, applications, etc. Accordingly, an OS can be loaded in phases or stages commensurate with policies, preferences, actions, context, etc. Similarly, a particular OS or group of OSs can be loaded to address a particular scenario or requirement.

Essentially, the innovation addresses the ever-increasing processing capabilities, storage, and functionality of portable computing devices by enabling logical OS selection. In other words, robust OSs can be installed to enable execution of sophisticated applications such as word processors, browsers, media players, network applications, etc. Additionally, if desired, a more limited OS could be installed to facilitate quick access to desired functionality (e.g., dialer in a smartphone) rather than waiting for a robust OS boot process to be implemented.

Moreover, different levels of authentication can be associated with the respective boot levels. These authentication levels can be employed to enhance security by limiting access to data and/or functionalities. For example, to place a simple call may require no or little authentication, while access to a VPN (virtual private network) portal to a secure network may require a long boot time and high level of authentication.

A variety of mechanisms (e.g., voice commands, quick buttons, drop down menus, etc.) can be employed to designate the desired boot level. If a quick boot is selected to make available certain functions, a full level boot may concurrently take place in the background to facilitate respective functionalities as various boot levels are achieved.

Yet another embodiment provides for a quick appliance mode. For instance, when the device is in full mode (e.g., robust OS), it can be handed off to someone (e.g., child or a stranger) and quickly put into a different mode (e.g., lesser robust OS) that only allows games, or local calls. In this example, the limited OS can enhance security by limiting (or prohibiting) access of confidential information or functionality.

In other aspects thereof, rules-based and machine learning & reasoning (MLR) logic is provided to automate functionality on behalf of a user. For instance, MLR logic can employ a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
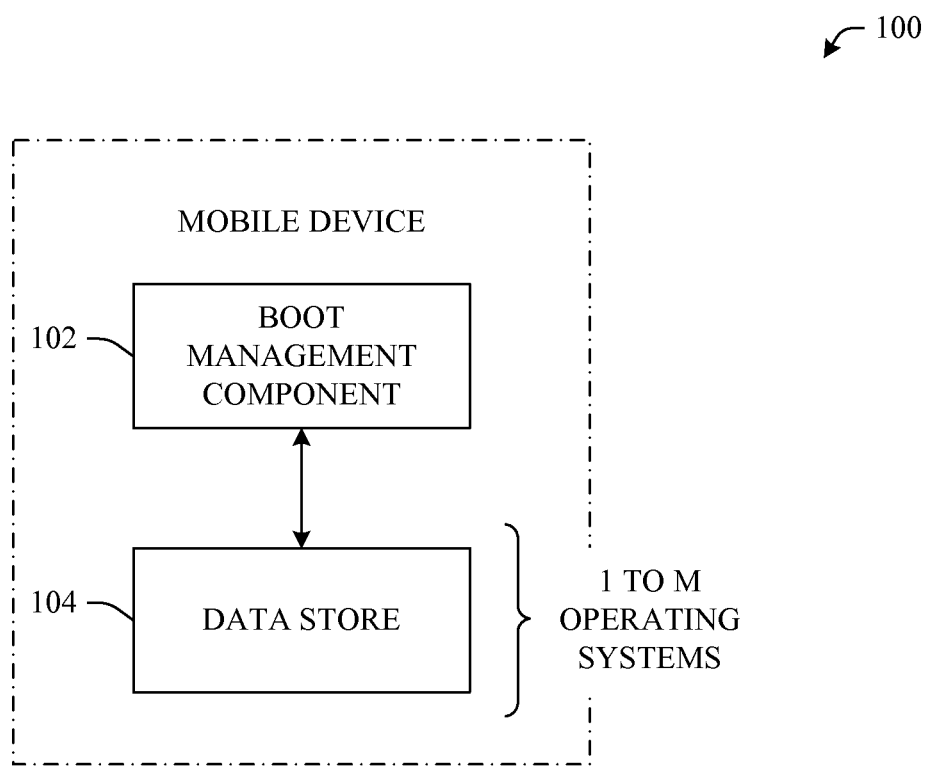
FIG. 1 illustrates a system that manages operating system (OS) boot level in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Portable computing devices (e.g., smartphones) continually increase in processing capabilities, storage, and functionality. As a result, users install and run sophisticated applications such as word processors, Internet browsers and media players. Moreover, in addition to core functionalities (e.g., dialer of a smartphone), many mobile devices today are used to access secure networks. As consequence of the heavier lication usage, boot time for such devices takes longer as more robust operating systems (OSs) are needed to address capabilities of these devices.

Referring initially to the drawings, FIG. 1 illustrates a mobile device 100 having a boot management component 102 and a data store therein. In operation, the boot management component 102 can enable multi-boot or multi-logon functionality via the mobile device 100. Essentially, by managing OS boot, the boot management component 102 can make available functionality and applications in accordance with most any factor including but, not limited to, identity (e.g., persona), enterprise associations, context, policy, preferences or the like.

By way of example, the boot management component 102 can load a streamline OS in order to provide a user with functionality quickly. In the meantime, the component 102 can continue to load a robust or complete version of the OS in order to make additional features and functionalities available. In yet other embodiments, versions of the OS can be loaded based upon 'identity,' context, policy or the like. It will be understood that this multi-stage boot or logon procedure can be customized or altered in most any manner as desired.

As described above, the boot management component 102 can enable a minimal state of functionality to be reached quickly while other functionality can become available upon a complete OS installation. By way of example, the mobile device 100 can make the dialer available to a user to make an emergency or desired call while continuing to boot a more robust (or different) OS in the background. In this example, it may possible for a user to make a telephone call so long as the contact information is entered from memory. In other words, part of the multi-state boot can refer to an 'enterprise stage OS' where the user will be able to access enterprise contacts. Here, this stage may require a more robust OS in order to effectuate access and/or authorization.

Essentially, the boot manager component 102 can be referred to as a 'hypervisor' where in virtualization technology, a 'hypervisor' is a software application that manages multiple OSs (or multiple instances of the same OS) on a single computing platform. The hypervisor can manage the system's memory, processor and other resources to allocate what each OS requires. In accordance with this innovation, this management can be identity-based, policy-based, context-based or the like. In most applications, hypervisors are designed for a particular processor architecture and may also be referred to as virtualization managers.

As illustrated, data store component 104 can include 1 to M OSs, where M is an integer. In aspects, these OSs can be representative of limited functionality, partial-functionality, full-functionality, application-based, identity-based, or the like. Accordingly, each of the OSs can be maintained within data store component 104. Further, although data store component 104 is illustrated inclusive of mobile device 100, it is to be understood that all or a portion of the data store component 104 can be remotely located without departing from the spirit and/or scope of the innovation. By way of example, data store component 104 (or portion thereof) can be 'cloud-based' such that access can be effected via a network (e.g., Internet) connection or access.

The discussion that follows includes features, functions and benefits of the core functionality of the innovation. In other words, the functionality of controlling and/or managing boot/login stages can be effected in most any manner without departing from the spirit and/or scope of the innovation. The discussion that follows describes many examples of selecting, customizing, tailoring, personalizing and/or automating boot stages—all of which are to be considered a part of the innovation.

Figure 2:
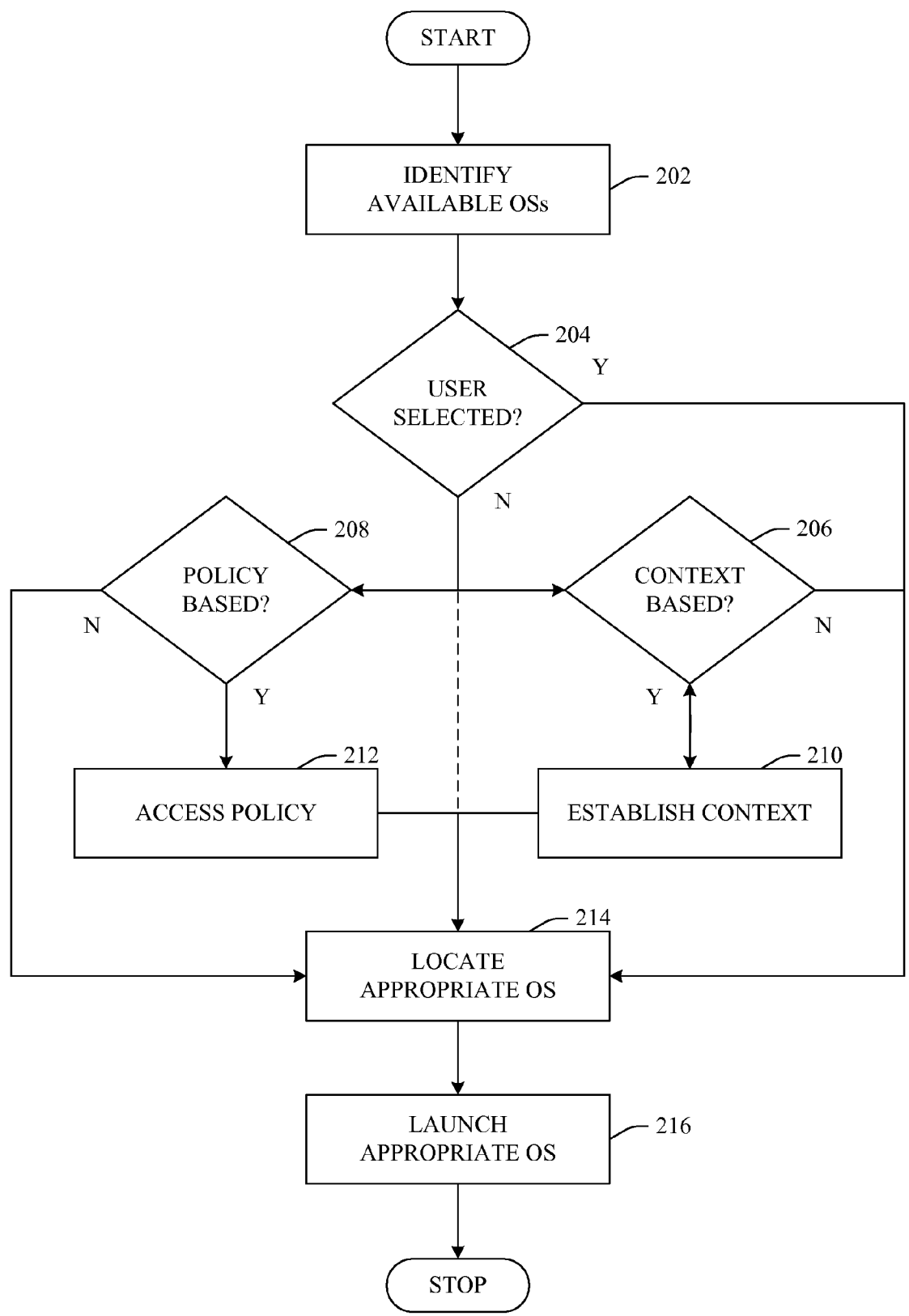
FIG. 2 illustrates an example flow chart of procedures that facilitates multi-stage OS boot in accordance with an aspect of the innovation.

FIG. 2 illustrates an example methodology of multi-boot or partial-boot in accordance with an aspect of the innovation. As described above, the innovation enables an OS (or group of OSs) to be booted in stages such that a mobile device can enhance ability of functionalities in accordance with a particular stage(s). In one aspect, a limited or initial stage can enable a user to make a call by enabling the dialer of a smartphone prior to enabling full functionality. Once the dialer is enabled, the smartphone can continue to load a robust version of the OS such that additional functionalities can become available as the OS reaches appropriate phases.

Still further, this OS stage-boot can be user-triggered or automatically triggered based upon factors such as identity, context or the like. These and other examples will be described in greater detail with reference to the figures that follow. While many examples and embodiments are included herein, it is to be understood and appreciated that these example are provided merely to add perspective to the innovation. Accordingly, additional examples exist which are to be included within the scope of this innovation.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, available OSs can be identified. In operation, OSs available to a mobile device can be located either on-board the mobile device and/or from a network-connected location (e.g., cloud-based, Internet, intranet) or the like. In the example of FIG. 2, a user can affirmatively or explicitly select an OS at 202. A decision is made at 204 to determine if a user explicitly or affirmatively selects a particular OS to employ upon booting the device. Here, a variety of mechanisms, including but not limited to, voice commands, quick buttons, drop-down or pull-down menus or the like can be employed to select a particular OS.

As well, these mechanisms can be employed to select specific functionalities which can be analyzed to identify a particular OS upon boot. For example, a user can state 'make a call' or other command whereby the device will automatically determine that the user desires a soft-boot (or limited boot) which makes enough functionality available to make the call. As described above, in this scenario, the device can continue to boot a complete or robust OS in order to make full functionality available without deferring a user's ability to make a phone call.

If an OS is not selected by a user at 204, a determination can be made if the selection is to be context-based or policy-based at 206 and 208 respectively. In other words, selection of an OS (or group of OSs) can be automated in accordance with a current context or policy. Although the example of FIG. 2 is directed to specific decision logic, it is to be understood that other examples exist that that employ other types of logic without departing from the spirit and/or scope of the innovation. By way of further example, machine learning and/or reasoning (MLR) can be employed to make decisions on behalf of a user or enterprise.

Referring first to the context-based decision of 206, here, contextual awareness such as location, time-of-day, motion, physiological factors, environmental factors, or the like can be employed to select an appropriate OS (or portion thereof). As shown, if context-based is to be applied at 206, the context can be established at 210, for example via sensory mechanisms such as global position sensors, calendar, clock, environmental sensors, physiological sensors, or the like. As illustrated by the dashed line in FIG. 2, a policy can be applied together or in accordance with the context.

At 208, in a policy-based example, a rule or implementation scheme can be applied to select an appropriate OS (or portion thereof) for boot. In other words, based upon a desired action, a defined or pre-programmed policy can be employed. The policy can be accessed at 212, for example, from an internal or external data store.

The appropriate OS can be located at 214—in accordance with a context and/or policy. Here, it is to be understood that the OS stages can be defined in order to enhance and/or optimize boot time in accordance with a user preference, action, or context. Once identified, the OS (or stage) can be launched at 216. The logic employed by the system can include most any pre-defined and/or inference-based (e.g., MLR) logic without departing from the spirit and scope of the innovation.

Figure 3:
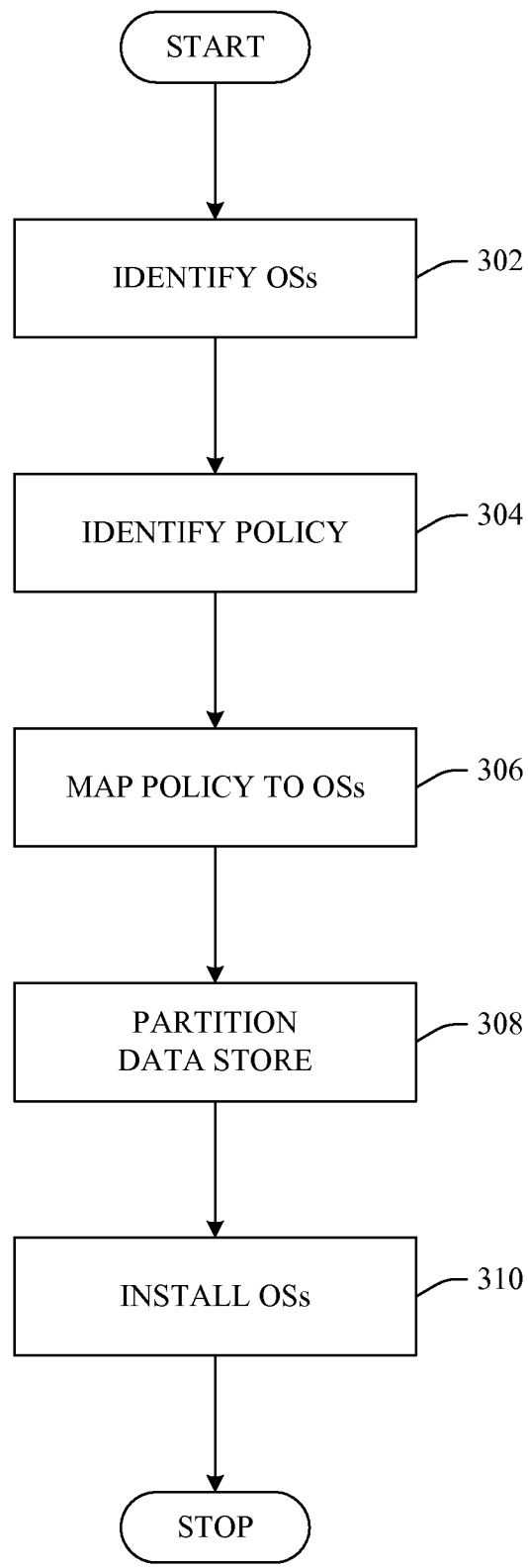
FIG. 3 illustrates an example flow chart of procedures that facilitates multi-OS installation into a mobile device in accordance with an aspect of the innovation.

Referring now to FIG. 3, there is illustrated a methodology of installing multiple OSs in accordance with the innovation. As described above, oftentimes, different OSs are preferred or even sometimes required in order to execute a desired application or functionality. Similarly, in accordance with the innovation, a particular OS can be divided into stages (e.g., light or robust) whereby each of the portions or stages of the OS can enable a particular functionality or group of functionalities.

Referring now to FIG. 3, at 302, a plurality of OSs can be identified in accordance with a preference, scenario, application, functionality or the like. It will be understood that this identification can be automatic or manual as desired. A policy or set of rules/preferences can be established at 304. In other words, a policy can identify which OS to apply (or execute) in a particular scenario, situation, context as well in connection with a particular identity (or persona), etc. Essentially, the policy established at 304 can associate most any OS (or portion thereof) to most any scenario, identity, context, application or the like.

The OSs can be mapped in accordance with the policy at 306. By way of example, suppose a user maps OS 'A' to the selection of making an emergency call. Here, this OS 'A' can be mapped to this situation such that whenever a selection to make an emergency call is selected (either manually or automatically), this OS can be selected and loaded in order to enable the action of making the call. As described above, it will be appreciated that this somewhat limited OS enables a call to made expeditiously without a need to wait for a robust OS to load.

Returning again to FIG. 3, at 308, storage of the OSs can commence by partitioning a data store. As will be understood, in accordance with enabling multiple OS loading, in an example, the data store is partitioned such that each OS is maintained in a disparate partition. Similarly, it will be understood that OSs can be maintained in disparate stores without departing from the spirit and/or scope of the innovation. A table or other suitable cross-reference can be used to identify an OS, location of the OS as well as any mapping (e.g., mapping from 306 supra). Ultimately, the OSs can be installed upon the data store (or group of stores) at 310.

In operation, an OS is determined—for example, an OS that corresponds to a user preference, application, scenario, context or the like. Once determined, a cross-reference or table is accessed in order to determine the location (e.g., partition) of the OS. Thereafter, the OS can be loaded as desired. Moreover, as can be defined by the policy, additional or more robust OSs can be loaded in the background after making the selected OS available. In aspects, this multi-load or multi-boot functionality can occur simultaneously in order to enhance functionality of the innovation.

Figure 4:
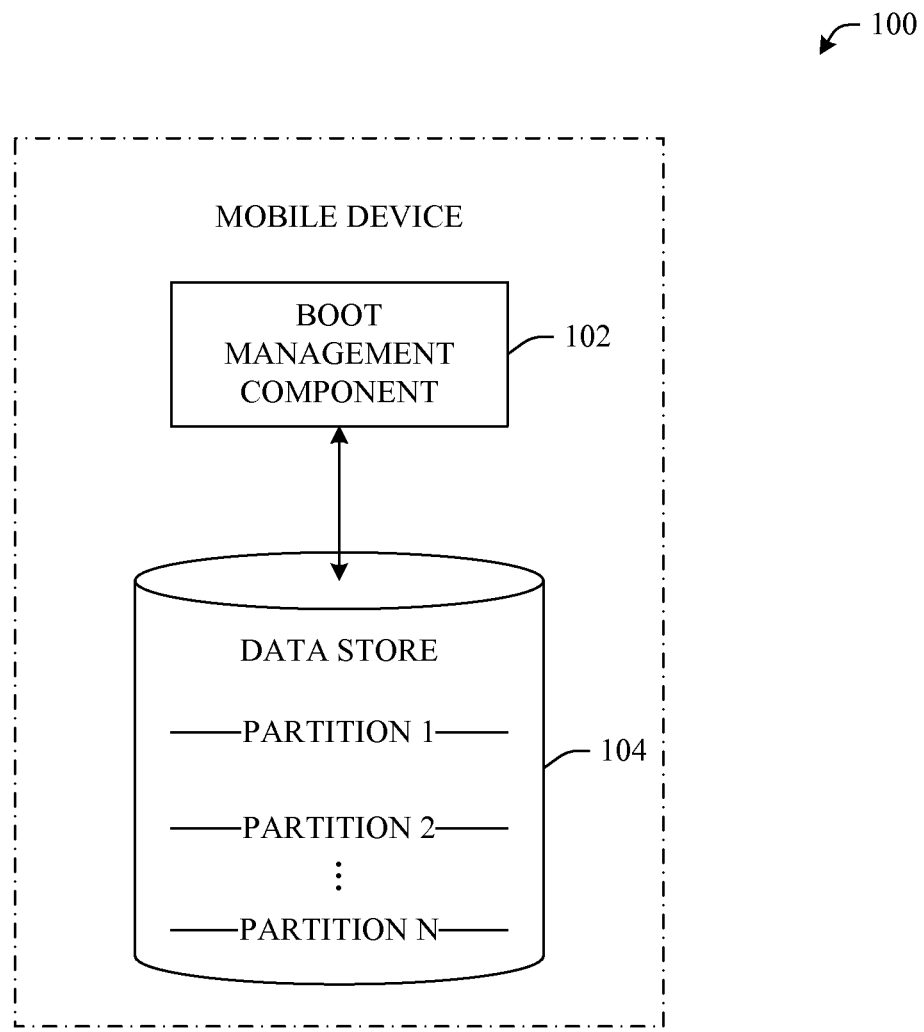
FIG. 4 illustrates an example block diagram of a boot management component and partitioned data store in accordance with a multi-OS capable mobile device in accordance with an aspect of the innovation.

Turning now to FIG. 4, an alternative example block diagram of system 100 (e.g., mobile device from FIG. 1) is shown. In particular, FIG. 4 illustrates that data store 104 can be segregated into 1 to N partitions, where N is an integer. Effectively, it will be understood that each partition can house a disparate OS as described above. As will be understood by those skilled in the art, in this embodiment, each OS can be stored within a designated partition of the data store.

In operation, a user can affirmatively select an OS to boot where the particular OS can provide access to specific applications, data, functionality, etc. As will be understood, this selection can occur manually or automatically on behalf of user. One useful aspect of this ability to select an OS is that boot time can be reduced in the event that a user does not desire (or need) full functionality of the device. By way of example, a user can acknowledge a desire to make an emergency (or quick) telephone call—here, the device can boot a lesser-robust version of an OS thereby providing the dialer functionality quickly.

In yet another example, selection can be based upon security and privacy. In these embodiments, a user can share a mobile device with a another person while essentially 'locking out' functionality and data/application access by swapping or selecting a lesser equipped OS. Similarly, this feature can be a default such that if a mobile device is misplaced or stolen, a lesser-robust OS can be automatically selected thereby protecting a user's privacy of data and/or applications. For instance, where a mobile device (e.g., smartphone) is equipped to access a VPN (virtual private network), it will be understood that a rather robust OS is needed to provide this authentication, authorization and therefore, access. In accordance with the innovation, a default or 'quick key' can be provided to easily limit VPN access by setting defaults (e.g., time-outs) which would automatically reduce the OS level based upon lack of use or other desired criteria.

Figure 5:
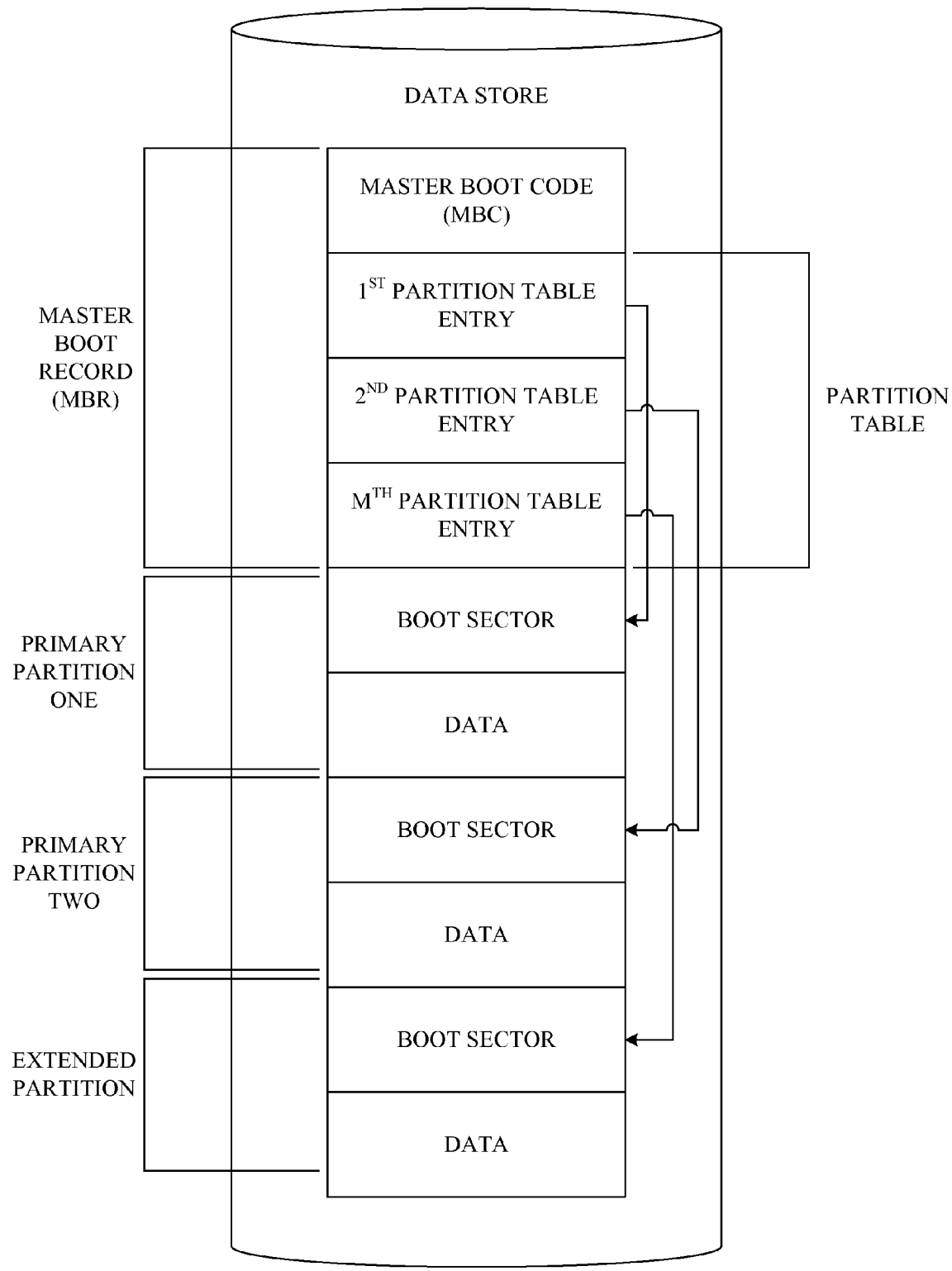
FIG. 5 illustrates an example data store partition structure in accordance with an aspect of the innovation.

Still further, OS selection can be based upon contextual awareness factors. In these examples, most any context criteria can be employed to effect (or automate) selection. For instance, location, date, time of day, engaged activity, PIM (personal information manager) data, or the like can be employed to intelligently determine a level of OS to implement. In a security-related aspect, this type of sophisticated logic could automatically detect (or infer) a situation that warrants a change in OS level. FIG. 5 illustrates an example data store partition structure in accordance with an embodiment of the innovation.

Referring now to FIG. 5, an example partition structure is shown in accordance with an aspect of the innovation. The following discussion describes one embodiment of partitioning a data store (e.g., drive) with respect to multiple OSs. When an OS installation is commenced, the system can ask the user to designate a partition (e.g., D:, E:, F:) for which to install the OS. Today, most hard discs can have a maximum of only four partitions however, this innovation contemplates most any desired number of partitions. In one example, these additional partitions are actual partitions. In other examples, the additional partitions can be employed by way of the concept of primary partitions, extended partitions, and logical partitions.

Here, the traditional partitions are referred to as 'primary partitions'—one of which could be referred to as an 'extended partition.' This extended partition enhances the traditional primary partitions in that it can house any number of smaller partitions known as 'logical partitions.' Therefore, in this configuration, the traditional four primary partition limit can be maintained while increasing the ability to further partition the drive.

In the example of FIG. 5, it will be understood that only two primary partitions are shown with a single extended partition. It is to be understood that the structure illustrated in FIG. 5 is provided merely to add perspective to the innovation and is not intended to limit the scope of the innovation in any way. Rather, this example is but one of many example structures that are to be included within the scope of the innovation described and claimed herein.

In operation, booting OSs relates to 'active partitions' and 'boot partitions.' An active partition refers to a designated partition that has the files for loading a default (or desired/selected) OS. A 'boot loader' is a program file that displays a boot menu and loads the required (or selected) OS—this is functionality of a selection component as described infra. Most often, only one partition on a disk can be an active partition. A boot partition is the partition where the OS is actually installed.

As described above, a smartphone can employ a variety of OSs to perform a number of tasks, run applications, provide security, streamline functionality or the like. For instance, one OS can be directed to core phone functionality (e.g., dialer) while another may be directed to VPN access or even gaming. Still further, OSs can be provided and installed which are representative of different manufacturers (even to address a similar function (e.g., scheduling, data management, privacy)).

Upon commencing installation of an OS on a partition, the system can first format the partition. It will be understood that 'formatting' essentially creates a file system on the partition for the OS installation. In other embodiments, the system can create, format, resize, and delete partitions within the data store as needed or appropriate.

As previously mentioned, a boot loader is a program that enables a user to select an OS from a list of available OSs. It will be appreciated that these boot loader programs are used to load an OS into execution or to display a boot menu (as described with reference to the selection component infra) where the user can make a choice from the available OSs installed on the mobile device. As well, function of the boot loader program can be managed on behalf of a user (e.g., MLR mechanisms) whereby a determination is made for the user based upon policy, preference, scenario or other contextual factors.

As illustrated in FIG. 5, loading an OS involves generating a master boot record (MBR) and a boot sector within each particular partition that corresponds to a particular OS. With continued reference to the figure, the MBR includes a partition table and master boot code (MBC). The partition table contains architectural and geometric information which enables location of the partitions located within the data store. This information is maintained within partition table entries as shown.

The MBC is generated by the OS installation procedures and provides executable code that enables loading of an OS or the boot loader program. In one aspect, and as illustrated in FIG. 5, the MBR is on the first sector of a disk. However, the MBR can be located on any other sector without departing from the scope of the innovation.

The partition table, and each of the table entries contained therein, is most often generated upon creation of a partition and is independent of the OS(s) installed on the device. In most instances, the relevant boot sector is on the first sector of each partition on a disk. On an active partition, the boot sector contains code that will load the default OS or the boot loader program. On boot partitions, the boot sector has executable code necessary to load the appropriate OS.

It will be understood that this is just one example structure of a multi-OS system in accordance with an aspect of the innovation. Here, this structure can be contained within a mobile device (e.g., smartphone, personal digital assistant (PDA), cell phone) and thereafter accessed in order to implement specific functionality, security procedures, applications or the like. It will be understood that, in alternative aspects, multiple data stores or cloud-based data stores can be employed. These alternative aspects are to be included within the scope of this innovation.

Figure 6:
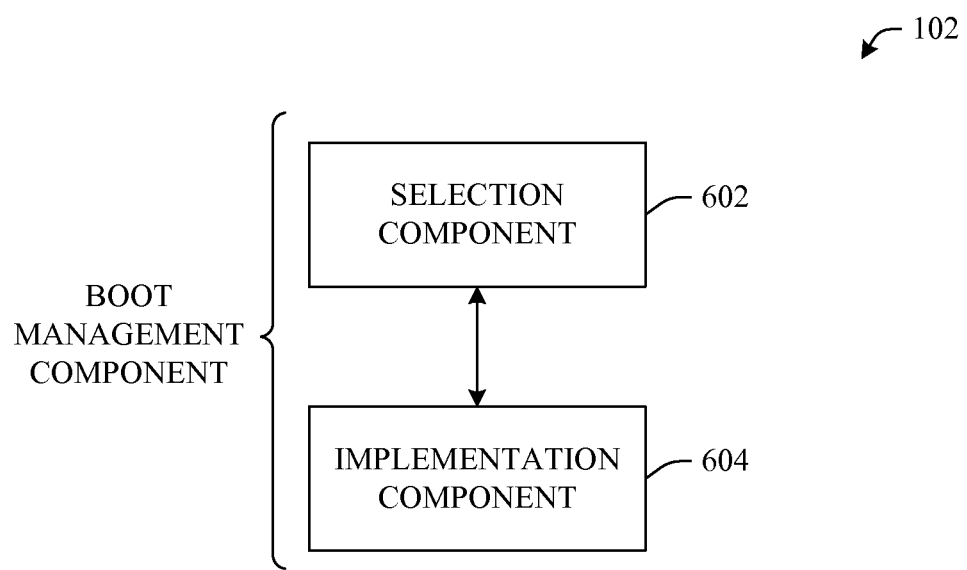
FIG. 6 illustrates an example block diagram of a boot management component that facilitates OS selection and implementation in accordance with an aspect of the innovation.

Referring now to FIG. 6, a block diagram of an example boot management component 102 is shown in accordance with an aspect of the innovation. Generally, the boot management component 102 can include a selection component 602 and an implementation component 604 which essentially enables multi-booting or multi-loading of OSs in accordance with a mobile device. In operation, the selection component 602 facilitates selection of an OS (or group of OSs) from available OSs whereas, the implementation component 604 establishes execution or initialization of the selected OS (or group of OSs).

As described above, this multi-stage OS booting or loading functionality within a mobile device can enable a user to reach a desired state quickly. In other words, rather than waiting for a complete boot of a robust OS, the innovation enables a user to select an OS (or for an OS to be selected on behalf of a user) which can rapidly and efficiently facilitate accomplishment of a desired functionality without a need to wait for a more robust, full-functionality, OS to load. In examples, the OS can be loaded in stages thereby affording access to tiered functionality. Additionally, as stages are loaded, the innovation can continue to load other stages in the background without impeding operation by a user. This background-loading can be seamless to a user and can effectively provide full functionality when completed.

In other aspects, multiple types (e.g., disparate manufacturers) of OSs can be loaded. In other words, rather than stages of the same OS, here, disparate OSs can be loaded which afford different functionalities. For instance, these different OSs can provide for different platforms which facilitate operation of different applications and functionalities. By way of example, a mail server from ABC company may require OS 'A' whereas a mail server from XYZ company may require OS 'B' in order synchronize data to/from a mobile device. If a user syncs with both the ABC and XYZ company's email servers, it can be possible to load multiple OSs to effectuate seamless synchronization. Similarly, each OS may be required to utilize company specific email protocols and interfaces. Here, the multi-boot functionality can enable selection of appropriate OSs in particular situations.

The selection component 602 can be representative of functionality related to the boot loader as described with reference to FIG. 5. For instance, the selection component 602 can provide a user with a menu of available OSs. In operation, the user can choose an OS from a drop down menu. Other selection mechanisms, including but not limited to voice commands, quick buttons, point & click mechanisms can be employed without departing from the innovation as herein described. These mechanisms can be employed to select a particular OS or, alternatively, to designate an OS boot level (e.g., stage) as desired.

The implementation component 604 is illustrative of the execution functionality that loads the OS or stage thereof. Thus, the implementation component 604 can locate and trigger code to facilitate loading of OSs in accordance with the innovation. For example, the implementation component 604 can locate an appropriate partition within a data store that houses files and data necessary to load or boot an OS.

As described above, multiple OSs can be located within disparate locations (e.g., data stores) without departing from the innovation. In these multi-location or multi-store embodiments, the implementation component 604 can map to an appropriate location and facilitate retrieval and loading of the OS (or group of OSs) thereafter. Still further, logical partitions can be employed in accordance with aspects of the innovation—these aspects are to be considered a part of this disclosure and claims appended hereto.

Figure 7:
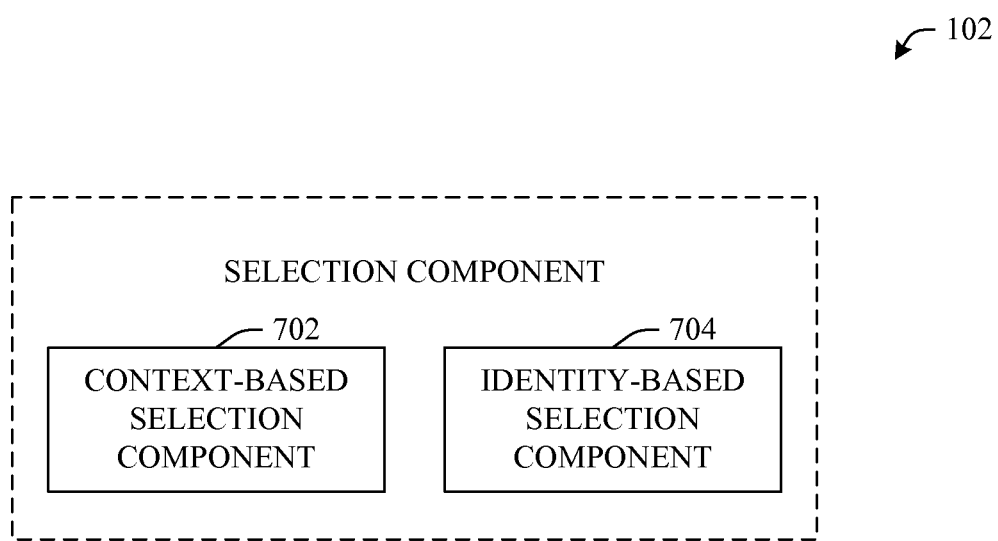
FIG. 7 illustrates an example block diagram of a selection component that enables context-based and identity-based selection in accordance with an aspect of the innovation.

Turning now to FIG. 7, an example selection component 102 is shown in accordance with an embodiment of the innovation. Generally, in addition to providing a menu or interpreting an affirmative user command (e.g., voice command), the selection component 102 can include a context-based selection component 702 and an identity-based selection component 704. As will be described in greater detail below, a policy or rule (e.g., implementation scheme) can be applied in connection with each of the illustrated sub-components (702, 704). Additionally, MLR mechanisms (or logic) can be employed to determine and/or infer an appropriate OS (or stage of OS) to implement in a given context or as related to a given identity.

The context-based selection component 702 can incorporate contextual awareness into the decision-making process of selecting an appropriate OS by processing information received, accessed or otherwise obtained from sensory mechanisms—which can include environmental as well as physiological sensors (e.g., global position systems, calendars, clocks, anxiety detectors, microphones, activity monitors, etc.). In other words, contextual factors including, but not limited to, user environment, device environment, date, time of day, location, engaged activity, schedule/appointments, enterprise affiliation, or the like can be factored into logic decisions when determining (or inferring) an appropriate OS (or stage of OS) to install.

The identity-based selection component 704 enables a user to define a specific 'identity' or persona by which an OS can be selected. A user can have multiple 'identities' or personas which can define criteria related to, but not limited to, policies, preferences, security, data access, or the like. Accordingly, these identities can be used to determine and/or infer an appropriate OS.

In operation, rules or implementation schemes can be defined into a policy or preference which can then be employed to assess selection criteria. While not illustrated, it will be understood that the innovation described herein is contemplated to include a user interface (UI) which enables rule generation. In addition to rules-based logic, the innovation can also employ MLR mechanisms to determine or infer an OS in accordance with most any number of factors. For instance, an identity (or persona) can be used to automatically select an OS for installation or boot.

In accordance with the rules-based alternative aspects, an implementation scheme (e.g., rule) can be applied to define and/or select an OS. It will be appreciated that the rules-based implementation can automatically define a stage of an OS or select a particular OS in accordance with specified criteria.

As described above, a user can employ a UI to establish a rule that can define an OS-selection policy and/or preference. In the example aspect of FIG. 7, the selection component 102 can be programmed or configured in accordance with a user-defined preference or policy. As well, a rule can be established in accordance with a specific hardware configuration or in accordance with a software application. For example, a rule can be constructed in accordance with specific memory capacity and/or display of a device. In other words, as previously discussed, a rule can be established to take into consideration the specific limitations of a hardware device (e.g., memory, processor). Thus, in one aspect, if a specific handheld device has low memory capacity, a rule can be generated to select a lesser robust or alternatively, to select an initial stage of an OS rather than loading the complete OS.

In addition to the rules-based logic, the innovation can employ MLR logic which facilitates automating one or more features in accordance with the subject innovation. The subject innovation (e.g., in connection with OS selection) can employ various MLR-based schemes for carrying out various aspects thereof. For example, a process for determining which OS to load in a given context or related to a particular identity can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria which OS to select or which portion (e.g., stage, level) of an OS to load in view of an application, context, identity, etc.

Figure 8:
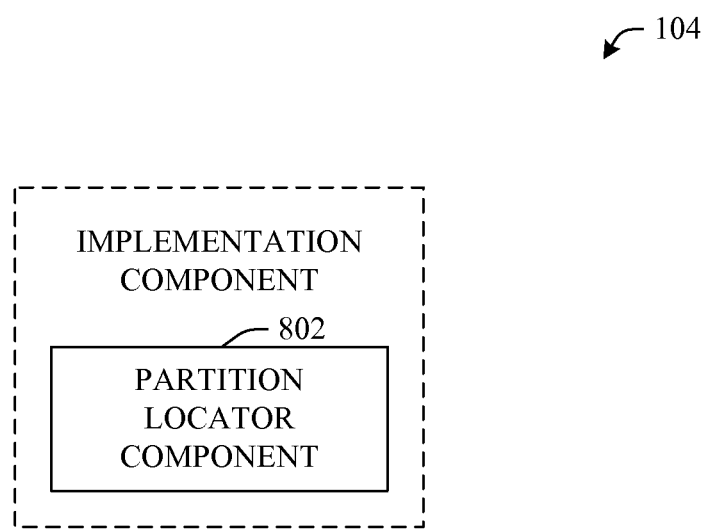
FIG. 8 illustrates an example block diagram of an implementation component that locates and loads a selected OS (or stage of OS) in accordance with an aspect of the innovation.

FIG. 8 illustrates a block diagram of an example implementation component 104 that includes a partition locator component 802. This sub-component 802 can locate and map to a specific location in order to effectuate booting of a particular OS in a given situation or in accordance with a specific selection. As described above, the OSs can be located within disparate partitions of a single disc or, alternatively, located in different suitable locations accessible by the mobile device.

Figure 9:
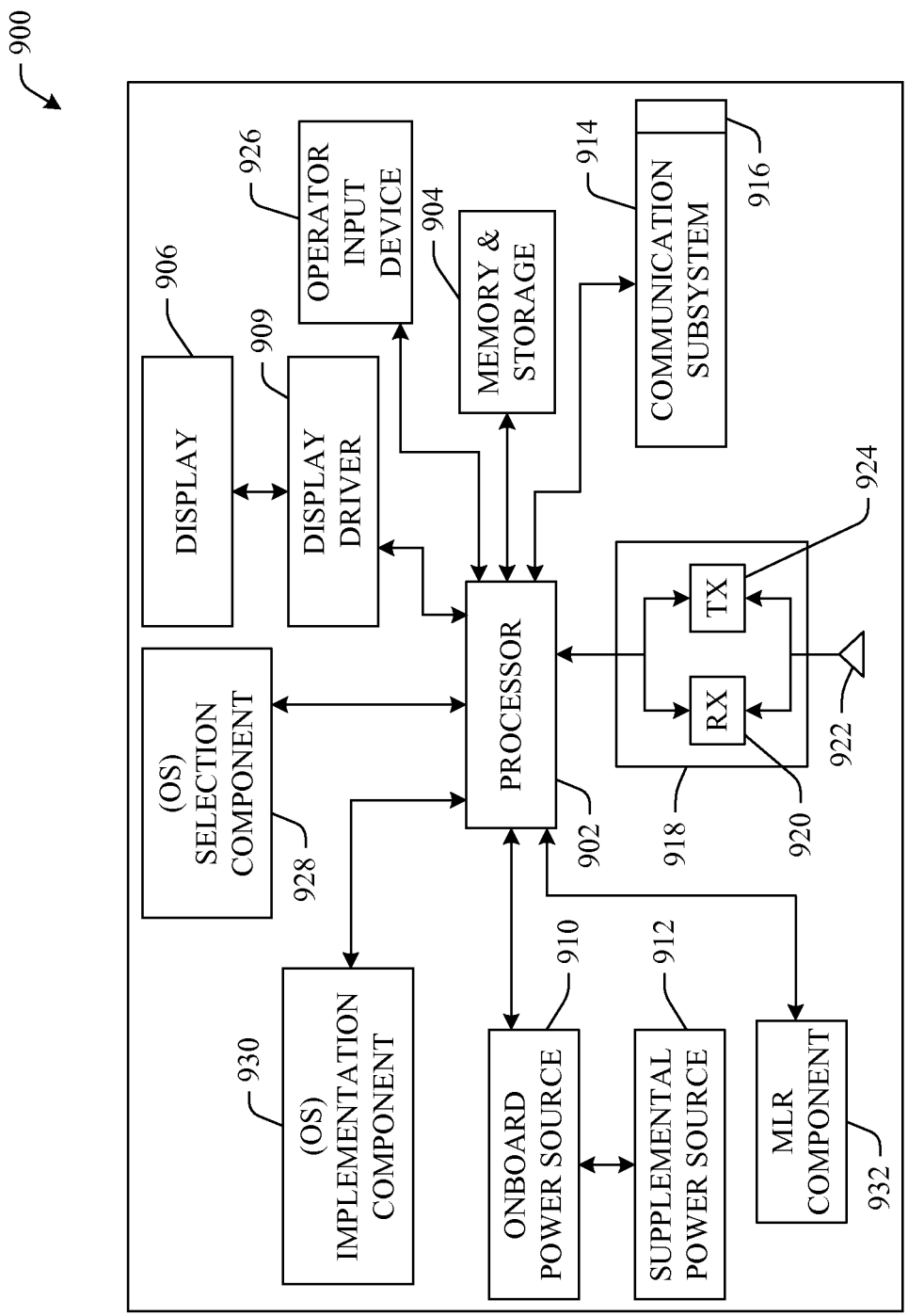
FIG. 9 illustrates a block architectural diagram of a mobile device capable of multi-stage or multi-OS boot in accordance with an aspect of the innovation.

Referring now to FIG. 9, there is illustrated a schematic block diagram of a portable device 900 according to one aspect of the subject innovation, in which a processor 902 is responsible for controlling the general operation of the device 900. It is to be understood that the portable device 900 can be representative of most any portable device including, but not limited to, a cell phone, smartphone, PDA, a personal music player, image capture device (e.g., camera), personal game station, etc.

The processor 902 can be programmed to control and operate the various components within the device 900 in order to carry out the various functions described herein. The processor 902 can be any of a plurality of suitable processors. The manner in which the processor 902 can be programmed to carry out the functions relating to the subject innovation will be readily apparent to those having ordinary skill in the art based on the description provided herein.

A memory and storage component 904 connected to the processor 902 serves to store program code executed by the processor 902, and also serves as a storage means for storing information such as data, services, metadata, device states or the like. As well, in other aspects, the memory and storage component 904 can be a stand-alone storage device or otherwise synchronized with a cloud or disparate network-based storage means (e.g., Exchange server), thereby establishing a local on-board storage.

The memory 904 can be a non-volatile memory suitably adapted to store at least a complete set of the information that is acquired. Thus, the memory 904 can include a RAM or flash memory for high-speed access by the processor 902 and/or a mass storage memory, e.g., a micro drive capable of storing gigabytes of data that comprises text, images, audio, and video content. According to one aspect, the memory 904 has sufficient storage capacity to store multiple sets of information relating to disparate services/OSs, and the processor 902 could include a program for alternating or cycling between various sets of information corresponding to disparate services/OSs.

A display 906 can be coupled to the processor 902 via a display driver system 908. The display 906 can be a color liquid crystal display (LCD), plasma display, touch screen display or the like. In one example, the display 906 is a touch screen display. The display 906 functions to present data, graphics, or other information content. Additionally, the display 906 can display a variety of functions that control the execution of the device 900. For example, in a touch screen example, the display 906 can display touch selection buttons which can facilitate a user to interface more easily with the functionalities of the device 900.

Power can be provided to the processor 902 and other components forming the device 900 by an onboard power system 910 (e.g., a battery pack). In the event that the power system 910 fails or becomes disconnected from the device 900, a supplemental power source 912 can be employed to provide power to the processor 902 (and other components (e.g., sensors, image capture device)) and to charge the onboard power system 910. The processor 902 of the device 900 can induce a sleep mode to reduce the current draw upon detection of an anticipated power failure.

The device 900 includes a communication subsystem 914 having a data communication port 916, which is employed to interface the processor 902 with a remote computer, server, service, or the like. The port 916 can include at least one of Universal Serial Bus (USB) and IEEE 1394 serial communications capabilities. Other technologies can also be included, but are not limited to, for example, infrared communication utilizing an infrared data port, Bluetooth™, etc.

The device 900 can also include a radio frequency (RF) transceiver section 918 in operative communication with the processor 902. The RF section 918 includes an RF receiver 920, which receives RF signals from a remote device via an antenna 922 and can demodulate the signal to obtain digital information modulated therein. The RF section 918 also includes an RF transmitter 924 for transmitting information (e.g., data, service) to a remote device, for example, in response to manual user input via a user input 926 (e.g., a keypad) or automatically in response to a detection of entering and/or anticipation of leaving a communication range or other predetermined and programmed criteria.

A selection component 928 can be employed to select an appropriate OS or stage of OS in accordance with a policy, preference, context, etc. Accordingly, an implementation component 930 can be employed to locate and load the OS in accordance with the selection. Still further, an optional MLR component 932 can be employed to automate one or more features of the innovation. As described in greater detail supra, the MLR component 932 (and/or a rules-based logic component (not shown)) can be used to effect an automatic action. It is to be appreciated that these components can enable functionality of like components (and sub-components) described supra.

Figure 10:
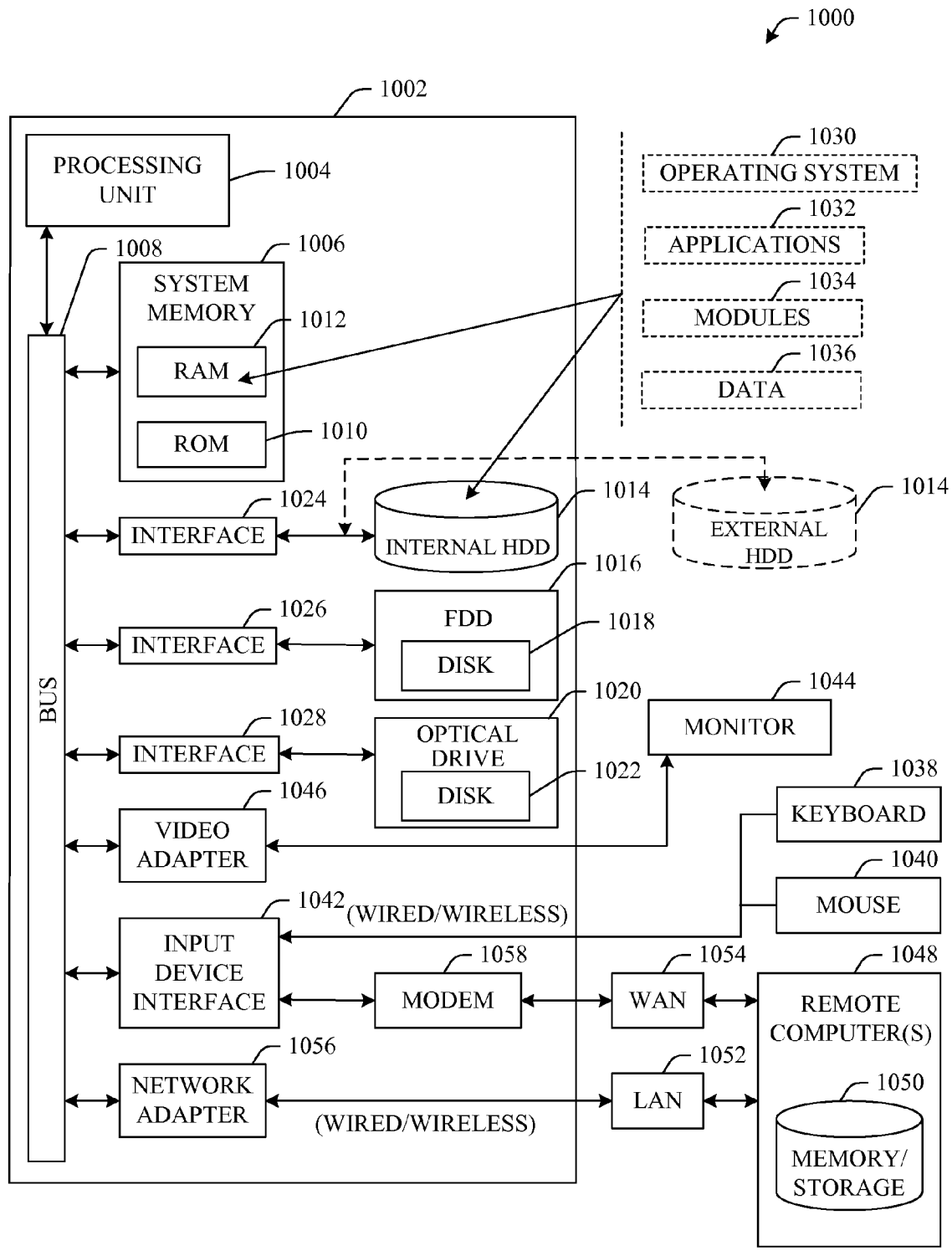
FIG. 10 illustrates a block diagram of a computer operable to execute the disclosed architecture.

Referring now to FIG. 10, there is illustrated a block diagram of a computer operable to execute the disclosed architecture. In order to provide additional context for various aspects of the subject innovation, FIG. 10 and the following discussion are intended to provide a brief, general description of a suitable computing environment 1000 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the innovation includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the innovation can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
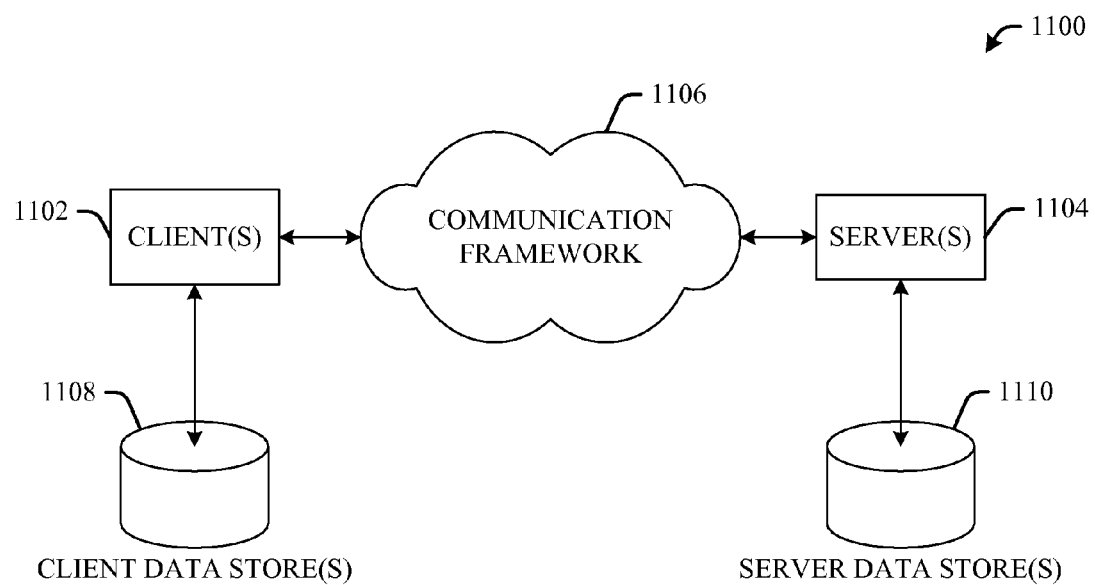
FIG. 11 illustrates a schematic block diagram of an exemplary computing environment in accordance with the subject innovation.

Referring now to FIG. 11, there is illustrated a schematic block diagram of an exemplary computing environment 1100 in accordance with the subject innovation. The system 1100 includes one or more client(s) 1102. The client(s) 1102 can be hardware and/or software (e.g., threads, processes, computing devices). The client(s) 1102 can house cookie(s) and/or associated contextual information by employing the innovation, for example.

The system 1100 also includes one or more server(s) 1104. The server(s) 1104 can also be hardware and/or software (e.g., threads, processes, computing devices). The servers 1104 can house threads to perform transformations by employing the innovation, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile cellular telephone, comprising:
    processing hardware;
    data storage hardware, coupled with the processing hardware, storing a hypervisor and a plurality of OSs (operating systems) including at least a first OS and a second OS; and
    the processing hardware, when the mobile device is operating, cooperating with the data store to execute the hypervisor, the hypervisor, when executing, providing machine virtualization to concurrently boot and execute the first OS and the second OS, the first OS having a substantially shorter boot time than the second OS, the first OS including cellular voice software that becomes available for use by the user when the first OS finishes booting and before the second OS finishes booting, the cellular voice software being available while the second OS continues to boot, the hypervisor concurrently executing the first OS and the second OS after the first OS has finished booting and after the second OS has finished booting.

2. The mobile cellular telephone of claim 1, at least a portion of the data store component including a cloud-based component.

3. The mobile cellular telephone of claim 1, wherein when the cellular telephone is powered on, the hypervisor is executed by the processing hardware and selects at least one of the plurality of OSs for booting by the hypervisor.

4. The mobile cellular telephone of claim 3, the data storage hardware further comprising a master boot record configured to employ master boot code and a partition table to identify and access a boot sector in a partition of the data storage hardware.

5. A mobile cellular telephone according to claim 3, wherein the boot management component comprises a context-based selection component that employs a context to choose either the at least one of the plurality of Oss.

6. The mobile cellular telephone of claim 2, further comprising a plurality of sensors that, when the cellular telephone is operating, provide sensed data to establish the context.

7. The mobile cellular telephone of claim 6, the data storage hardware further storing a policy that controls section of at least one of the Oss, the policy being applied in accordance with the sensed data.

8. The mobile cellular telephone of claim 1, the data storage hardware further storing a rules-based selection component that, when the mobile cellular telephone is operating, is executed by the processing hardware to select at least one of the plurality of OSs based upon a defined criterion.

9. The mobile cellular telephone device of claim 1, the first OS being configured to facilitate operation of a voice command.

10. The mobile cellular telephone of claim 1, the data storage hardware further storing a hand-off mode component that, when the computing device is operating, is executed by the processing hardware to limit a functionality of at least one of the plurality of OSs responsive to a signal indicating a determination that the mobile cellular telephone device is being handed off to another user.

11. The mobile cellular telephone of claim 1, the data storage hardware further storing an identity-based selection component that, when the mobile cellular telephone is operating, is executed by the processing hardware to enable selection of at least one of the plurality of OSs as a function of a determination of an identity of a person operating the mobile cellular telephone.

12. The mobile cellular telephone of claim 1, the data storage hardware further storing an implementation component that, when the mobile cellular telephone is operating, is executed by the processing hardware to partition the data storage hardware into a plurality of partitions, locate at least one of the plurality of OSs within the plurality of partitions, and enable launch of the at least one of the plurality of OSs.

13. The mobile cellular telephone of claim 12, each of the partitions being configured to employ a master boot code and a partition table to access a partition-specific boot sector to launch the at least one of the plurality of the OSs.

14. A mobile cellular telephone, comprising:
    a processor;
    a data store component, configured to cooperate with the processor, that stores a plurality of OSs (operating systems) including at least a first OS and a second OS, the data store component further storing a virtualization component to provide hardware virtualization to enable concurrent execution of the first OS and the second OS on the mobile cellular telephone;
    the processor, when the mobile cellular telephone is operating, executing the virtualization component, the virtualization component concurrently booting the first OS and the second OS from the data store component, the first OS including application software that becomes available for use by the while the second boot stage continues to boot, wherein the first OS and the second OS are executed concurrently by the virtualization component when both OSs have finished booting;
    the hypervisor, when the mobile cellular telephone is operating, is executed by the processor to select and launch at least one of the plurality of OSs via a mobile device, the hypervisor including a context-based selection component, including rules logic able to evaluate arbitrary user-defined rules, and using the rules logic to evaluate current user-defined rules stored on the data storage component against a current context of the mobile cellular telephone and using an outcome of the evaluating to choose the first OS from among the plurality of OSs.

15. A mobile cellular telephone, comprising:
    a data store component that stores multiple operating systems (OSs), the multiple OSs including a first OS and a second 0S, the first OS including software that, when executed, enables cellular communication by the mobile device after the first OS has completed booting;
    the data store component further storing a hypervisor that, when the mobile cellular telephone is operating, is executed by the processor to provide hardware virtualization for the first OS and for the second OS to enable the first OS and the second OS, when both have finished booting, to execute concurrently on the mobile cellular telephone, the cellular communication continuing to be enabled on the first OS while the second OS has finished booting and is executing.

* * * * *